United States Patent
Hama et al.

(10) Patent No.: US 7,342,067 B2
(45) Date of Patent: Mar. 11, 2008

(54) WATER-BASED INK

(75) Inventors: Yoshinori Hama, Wakayama (JP); Norio Ueyama, Wakayama (JP)

(73) Assignee: Kao Corporation, Tokyo (JP)

( * ) Notice: Subject to any disclaimer, the term of this patent is extended or adjusted under 35 U.S.C. 154(b) by 256 days.

(21) Appl. No.: 10/813,274

(22) Filed: Mar. 31, 2004

(65) Prior Publication Data

US 2005/0009951 A1    Jan. 13, 2005

(30) Foreign Application Priority Data

Jul. 9, 2003    (JP)    ............................ 2003-194283

(51) Int. Cl.
- *C08L 33/02* (2006.01)
- *C08L 33/08* (2006.01)
- *C08L 33/10* (2006.01)
- *C08L 25/08* (2006.01)
- *C08L 67/00* (2006.01)
- *C08L 75/00* (2006.01)
- *C09D 11/10* (2006.01)

(52) U.S. Cl. .................. 524/556; 524/560; 524/577; 524/590; 524/601; 523/160

(58) Field of Classification Search ............... 523/160, 523/161

See application file for complete search history.

(56) References Cited

U.S. PATENT DOCUMENTS 4,597,794 A * 7/1986 Ohta et al. .................. 347/100
5,913,972 A * 6/1999 Kanou et al. ............. 106/31.87
6,412,940 B1 * 7/2002 Inoue et al. ................. 347/101
6,960,622 B2 * 11/2005 Nakano ...................... 523/160

FOREIGN PATENT DOCUMENTS

| JP | 9-124968 | 5/1997 |
|---|---|---|
| JP | 2004-51777 | 2/2004 |

OTHER PUBLICATIONS

Machine Translation of JP 2004-026927 A (2004).*
Machine Translation of JP 2003-226832 A (2003).*
Patent Abstracts of Japan, JP 8-183920, Jul. 16, 1996.
Patent Abstracts of Japan, JP 8-218013, Aug. 27, 1996.
Patent Abstracts of Japan, JP 10-088042, Apr. 7, 1998.
Patent Abstracts of Japan, JP 2001-271008, Oct. 2, 2001.
Patent Abstracts of Japan, JP 2003-226831, Aug. 15, 2003.
Patent Abstracts of Japan, JP 2003-226832, Aug. 15, 2003.
Patent Abstracts of Japan, JP 2004-026927, Jan. 29, 2004.

* cited by examiner

*Primary Examiner*—Callie Shosho
(74) *Attorney, Agent, or Firm*—Oblon, Spivak, McClelland, Maier & Neustadt, P.C.

(57) ABSTRACT

A process for preparing an aqueous dispersion of a pigment, comprising kneading a mixture containing a pigment, a polymer having a salt-forming group, a neutralizing agent for neutralizing the polymer having a salt-forming group, an organic solvent and water, wherein the concentration of the solid matter is 50 to 80% by weight; adding water and/or an organic solvent to the resulting kneaded mixture to dilute the mixture; and dispersing the solid matter in the resulting diluted mixture; and a water-based ink comprising the aqueous dispersion of a pigment.

16 Claims, No Drawings

WATER-BASED INK

FIELD OF THE INVENTION

The present invention relates to a water-based ink. More specifically, the present invention relates to a water-based ink and a process for preparing an aqueous dispersion of a pigment which is usable for the water-based ink. The water-based ink can be suitably used for, for instance, a water-based ink for inkjet recording or the like.

BACKGROUND OF THE INVENTION

In inks usable for inkjet printers, a pigment ink has been recently used in order to improve water resistance and light fastness.

The pigment ink has been generally prepared by dispersing a pigment in an organic solvent or a liquid mixture of water and an organic solvent in a low solid matter concentration of 10 to 40% by weight or so. Japanese Patent Publication Nos. Hei 8-183920A and Hei 8-218013A disclose that a sand-mill, a beads-mill, a high-pressure homogenizer or the like is used as a dispersing device in the dispersion.

It has been desired to develop a pigment ink having a dispersion particle diameter as small as possible since the pigment ink is inferior in gloss to a dye ink, and being more excellent in filterability with a filter since the pigment ink is inferior in filterability to the dye ink.

However, in the method of dispersing a pigment in a low solid matter concentration as described in the above literatures, the pigment cannot be sufficiently atomized, and filterability is worsened when a pigment having a strong aggregating force of primary particles is used or when the dispersion on the level of the primary particles is necessitated.

On the other hand, as a process of using a solid color compound, Japanese Patent Publication Nos. Hei 10-88042A and 2001-271008A disclose a process comprising mixing or dispersing a solid color compound obtained by kneading a mixture of a molten resin or an organic solvent solution, having an acid value with a pigment, water, an organic solvent and a base. However, in this process, the dispersion into water and the organic solvent may become insufficient in some cases since the solid matter concentration of the solid color compound is very high and the resin is not neutralized.

SUMMARY OF THE INVENTION

The present invention relates to:
(1) a process for preparing an aqueous dispersion of a pigment, comprising:
(A) kneading a mixture containing a pigment, a polymer having a salt-forming group (hereinafter simply referred to as "polymer"), a neutralizing agent for neutralizing the polymer having a salt-forming group, an organic solvent and water, wherein the concentration of solid matter is 50 to 80% by weight (hereinafter simply referred to as "mixture");
(B) adding water and/or an organic solvent to the resulting kneaded mixture to dilute the mixture; and
(C) dispersing the solid matter in the resulting diluted mixture; and
(2) a water-based ink comprising the aqueous dispersion of a pigment, obtained by the above-mentioned process.

DETAILED DESCRIPTION OF THE INVENTION

An object of the present invention is to provide a process capable of preparing an aqueous dispersion of a pigment in which dispersed particles have a smaller average particle diameter than a conventional process comprising dispersing in a low solid matter concentration and a conventional process using a solid color compound; and a water-based ink being excellent in filterability and gloss.

In the present invention, the pigment may be any one of inorganic pigments and organic pigments. Also, these pigments can be used together with an extender as occasion demands.

The inorganic pigment includes, for instance, carbon black, metal oxides, metal sulfides, metal chlorides, and the like. Among them, in a water-based black ink, carbon black is especially preferable. The carbon black includes furnace black, thermal lamp black, acetylene black, channel black and the like.

The organic pigment includes, for instance, azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments and the like.

The extender includes silica, calcium carbonate, talc and the like.

The amount of the pigment is preferably from 100 to 700 parts by weight, more preferably from 200 to 600 parts by weight, even more preferably from 300 to 500 parts by weight based on 100 parts by weight of the resin solid matter of the polymer, from the viewpoint of optical density.

The present invention is especially suitable for dispersing a pigment of which primary particles have a strong aggregating force. The shape of the pigment of which primary particles have a strong aggregating force includes acicular forms, plate-like forms and the like. Specifically, use of a magenta pigment is preferable.

As the polymer, a water-insoluble polymer which can contain a pigment, or a water-soluble polymer which can disperse a pigment can be used. Among them, the water-insoluble polymer is preferable. It is preferable that the water-insoluble polymer is a polymer having a solubility of less than 2 g when the polymer is dissolved in 100 g of water at 100° C. after the neutralization. When the water-insoluble polymer is used, an aqueous dispersion of polymer particles containing a pigment is obtained. When the water-soluble polymer is used, a pigment dispersion is obtained. Therefore, in the present invention, the aqueous dispersion of a pigment includes an aqueous dispersion of polymer particles containing a pigment or a pigment dispersion.

Examples of the polymer include vinyl-based polymers, polyester-based polymers, polyurethane-based polymers, and the like. Among these polymers, the vinyl-based polymers are preferable. The vinyl-based polymer includes a polymer prepared by polymerizing at least one monomer selected from the group consisting of styrene, (meth)acrylic acid and (meth)acrylic acid ester. The weight-average molecular weight of the polymer is preferably 10000 to 500000, from the viewpoint of increasing the durability of an ink after printing, more preferably 52000 to 300000.

The polymer has a salt-forming group, and a neutralizing agent is used for neutralizing the salt-forming group.

As the neutralizing agent, an acid or a base can be used depending upon the kind of the salt-forming group. The acid includes inorganic acids such as hydrochloric acid and sulfuric acid; and organic acids such as acetic acid, propionic acid, lactic acid, succinic acid, glycollic acid, gluconic acid and glyceric acid. The base includes tertiary amines such as trimethylamine and triethylamine, ammonia, sodium hydroxide, potassium hydroxide and the like. The amount of the neutralizing agent is not limited to specified ones. It is preferable that the amount of the neutralizing agent is adjusted so that the resulting aqueous dispersion becomes usually neutral, for instance, pH 4.5 to 9.5. The salt-forming group may be previously neutralized with a neutralizing agent before mixing a pigment or the like with the neutralizing agent.

The organic solvent is preferably an alcohol-based solvent, a ketone-based solvent, an ether-based solvent, an aromatic hydrocarbon-based solvent, an aliphatic hydrocarbon-based solvent, or a halogenated aliphatic hydrocarbon-based solvent, and more preferably a hydrophilic organic solvent.

The alcohol-based solvent includes methanol, ethanol, isopropanol, n-butanol, tert-butanol, isobutanol, diacetone alcohol, and the like. The ketone-based solvent includes acetone, methyl ethyl ketone, diethyl ketone, methyl isobutyl ketone, and the like. The ether-based solvent includes dibutyl ether, tetrahydrofuran, dioxane, and the like. The aromatic hydrocarbon-based solvent includes benzene, toluene, and the like. The aliphatic hydrocarbon-based solvent includes heptane, hexane, cyclohexane, and the like. The halogenated aliphatic hydrocarbon-based solvent includes methylene chloride, 1,1,1-trichloroethane, chloroform, carbon tetrachloride, 1,2-dichloroethane, and the like. Among them, acetone and methyl ethyl ketone are preferable.

The amount of water is preferably 100 to 1000 parts by weight, more preferably 200 to 500 parts by weight based on 100 parts by weight of the above-mentioned organic solvent from the viewpoint of affinity of the pigment and the mixture of water and the organic solvent.

The concentration of the solid matter in the mixture is at least 50% by weight, preferably at least 65% by weight, from the viewpoint of obtaining an effective shearing force upon kneading the mixture. Also, the concentration is at most 80% by weight, preferably at most 75% by weight from the viewpoint of avoidance of the increase in viscosity of the resulting kneaded mixture too high to homogeneously knead, and avoidance of disintegration of the kneaded mixture into particles. From the viewpoint mentioned above, the concentration of the solid matter in the above-mentioned mixture is 50 to 80% by weight, more preferably 65 to 75% by weight. The solid matter in the mixture as referred to herein is a combined amount of solid matters of the pigment, the polymer and the neutralizing agent.

In the present invention, during kneading, since the neutralizing agent, the organic solvent and water exist in the mixture besides the pigment and the polymer, the adsorption of the polymer to the pigment becomes stronger, so that the fine grinding can be sufficiently carried out.

In kneading the mixture, as a kneading device, there can be employed, for instance, a kneader, a planetary mixer, an extruder, a roll-mill or the like. Among them, the kneader is preferable from the viewpoint of strong shearing force and facilitation of the control of the operating conditions.

In a kneaded mixture obtained by a kneader or a planetary mixer, coarse grains may be contained in some cases. Therefore, in this case, it is preferable that the kneaded mixture is further kneaded with a roll-mill. As the roll-mill, a double roll-mill or a triple roll-mill can be used. In the kneading, it is preferable to add water thereto. Also, kneading may be carried out in the roll-mill while evaporating the organic solvent from the kneaded mixture.

When raw materials for the mixture are supplied to a kneading device, (1) these materials may be supplied to the kneading device separately, (2) a pigment, a polymer, a neutralizing agent for neutralizing the polymer, an organic solvent and water may be previously mixed in a separate container, and thereafter the mixture is collectively supplied to the kneading device, or (3) a polymer, an organic solvent, water and a neutralizing agent may be previously mixed in a separate container, and the resulting mixture and a pigment are supplied to the kneading device. Among these methods, preferable is a method comprising (I-1) mixing a polymer, an organic solvent, water and a neutralizing agent in a kneading device, or (I-2) mixing these raw materials in a separate container, and supplying the resulting mixture to the kneading device, and thereafter (II) supplying a pigment thereto from the viewpoint of neutralizing the polymer and affinity of the mixture and the pigment.

The temperature during the kneading is preferably at most 50° C., more preferably 5° to 50° C., even more preferably 10° to 35° C., especially preferably 15° to 30° C., from the viewpoint of obtaining a shearing stress appropriate for kneading, and from the viewpoint of improving adsorbability of the polymer to the pigment. When the temperature is within this kneading temperature, it is thought that more homogenous polymer particles containing a pigment are obtained since the solubility of the polymer to the organic solvent is lowered and the adsorbabiltiy to the pigment can be improved. The temperature during kneading can be adjusted by the temperature or the flow rate of a refrigerant which is allowed to flow through the jacket of the kneading device.

It is preferable that kneading is carried out until the raw materials for the mixture are homogeneously dispersed. Thus, after the kneading, the resulting kneaded mixture is diluted by adding water and/or an organic solvent thereto. When used in a water-based ink, it is preferable that the kneaded mixture is diluted with water in order to remove an organic solvent in a step subsequent to dilution.

The concentration of the solid matter may be a concentration that can be treated in a subsequent dispersion step. The concentration is usually 10 to 40% by weight.

The dilution method for adding water and/or an organic solvent to the kneaded mixture is not limited to specified ones. A known dilution device can be used for the dilution. The device includes, for instance, disper, butterfly mixer and the like.

Next, the solid matter contained in the resulting diluted mixture is dispersed in water and/or an organic solvent. In the dispersion of the diluted mixture, a dispersion device can be used.

The dispersion device includes a ball-mill, a beads-mill, a high-pressure homogenizer, a high-speed agitation-type dispersion device, and the like. Among them, the high-pressure homogenizer is preferable since the amount of inorganic impurities contaminated can be reduced.

The high-pressure homogenizer includes those comprising a chamber having a fixed flow path of a treatment solution, those comprising a homogenizing valve, which can control the width of a flow path of a treatment solution, and the like. The high-pressure homogenizer comprising a chamber having a fixed flow path of a treatment solution includes Microfluidizer (manufactured by Microfluidics, trade name); Nanomizer (manufactured by Nanomizer, trade name); Ultimizer (manufactured by Suginomachine, trade name), and the like. The high-pressure homogenizer having a homogenizing valve includes High-Pressure Homogenizer (manufactured by Rannie, trade name); High-Pressure Homogenizer (manufactured by Sanmaru Kikai Kogyo K.K., trade name); High-Pressure Homogenizer (manufactured by Izumi Food Machinery, trade name); and the like.

The pressure during the dispersion with the high-pressure homogenizer is preferably at least 50 MPa, more preferably at least 80 MPa, because the polymer particles having a desired particle diameter can be readily obtained in a short period of time.

Thus, the aqueous dispersion of a pigment of the present invention is obtained.

When a water-based ink is prepared by using the aqueous dispersion of a pigment of the present invention, it is preferable to remove an organic solvent from this aqueous dispersion.

The method for removing the organic solvent from the aqueous dispersion of a pigment is not limited to specified ones. A distillation method under reduced pressure is preferable, and thin film distillation is more preferable.

Coarse grains may be removed from the aqueous dispersion of a pigment by centrifugation, filtration with a filter or the like as occasion demands.

The water-based ink of the present invention can be obtained by adding an additive such as a wetting agent, a dispersant, a defoaming agent, a mildewproof agent or a chelating agent as occasion demands. It is desired that the content of the solid matter in the aqueous dispersion used in the water-based ink is adjusted so that the content of the polymer particles in the aqueous dispersion of a pigment-containing polymer particles, or the content of the pigment particles of the pigment dispersion contained in the water-based ink, is 1 to 30% by weight, preferably 2 to 15% by weight.

EXAMPLES

Preparation Example 1

A reaction vessel was charged with 20 parts by weight of methyl ethyl ketone, 0.03 parts by weight of a polymerization chain transfer agent (2-mercaptoethanol), 2.5 parts by weight of polypropylene glycol monomethacrylate [manufactured by Aldrich, Japan K.K., number-average molecular weight: 375], 1.2 parts by weight of methacrylic acid and 6.3 parts by weight of styrene monomer, and the mixture was blended. Nitrogen gas replacement was sufficiently carried out, to give a mixed solution.

On the other hand, a dropping funnel was charged with 22.5 parts by weight of polypropylene glycol monomethacrylate [manufactured by Aldrich, Japan K.K., number-average molecular weight: 375], 10.8 parts by weight of methacrylic acid and 56.7 parts by weight of styrene monomer. Thereto were added 0.27 parts by weight of a polymerization chain transfer agent (2-mercaptoethanol), 60 parts by weight of methyl ethyl ketone, and 1.2 parts by weight of 2,2'-azobis(2,4-dimethylvaleronitrile), and the mixture was blended. Nitrogen gas replacement was sufficiently carried out, to give a mixed solution.

The temperature of the mixed solution in the reaction vessel was raised to 65° C. under nitrogen atmosphere while stirring the mixed solution. The mixed solution in the dropping funnel was gradually added dropwise thereto over a period of 3 hours. After 2 hours passed from the termination of the dropwise addition at 65° C., a solution prepared by dissolving 0.3 parts by weight of 2,2'-azobis(2,4-dimethylvaleronitrile) in 5 parts by weight of methyl ethyl ketone was added thereto, and the resulting mixture was aged at 65° C. for 2 hours, and then at 70° C. for 2 hours to give a polymer solution A.

A part of the resulting polymer solution A was dried at 105° C. under reduced pressure for 2 hours, and the polymer was isolated by removing the solvent. The weight-average molecular weight of the polymer was determined by gel permeation chromatography using polystyrene as a standard substance, and chloroform containing 1 mmol/L dodecyldimethylamine as a solvent. As a result, the weight-average molecular weight was 55000.

Example 1

Five parts by weight of a polymer A obtained by drying the polymer solution A obtained in Preparation Example 1 under reduced pressure was dissolved in 5 parts by weight of methyl ethyl ketone. Seven parts by weight of ion-exchanged water and 0.47 parts by weight of a 48% aqueous sodium hydroxide were added to the resulting solution. The mixture was blended with a disper type impeller for 30 minutes, and thereafter the mixture was supplied into a kneader. Further, 20 parts by weight of a quinacridone pigment [C.I. Pigment Red 122, manufactured by DAINIPPON INK & CHEMICALS, INC. under the trade name of Fastogen Super Magenta RG] was added thereto. The solid content of the mixture was 67% by weight. The mixture was kneaded at 20° C. while allowing cooling water of 1° C. to flow through a jacket for two hours in a tightly sealed condition, to give a kneaded mixture.

The resulting kneaded mixture was kneaded with a triple-roll mill, while adding 10 parts by weight of ion-exchanged water thereto. Thereafter, 50 parts by weight of ion-exchanged water was added thereto. The resulting solution was passed through a Microfluidizer [trade name, manufactured by Microfluidics Corp.] 5 times as a dispersing operation under pressure of 200 MPa.

Thirty parts by weight of ion-exchanged water was added to the resulting dispersion while stirring, and thereafter the organic solvent and a part of water were removed under reduced pressure at 60° C. Further, the residue was filtered with a filter having a pore diameter of 5 μm [manufactured by Nihon Pall Ltd.], to remove coarse grains, to give an aqueous dispersion of polymer particles containing a pigment, the solid content of which was 20% by weight.

Next, 27.5 parts by weight of the resulting aqueous dispersion of polymer particles containing a pigment, 15.5 parts by weight of glycerol, 5 parts by weight of propylene glycol monobutyl ether, 3.5 parts by weight of triethylene glycol monobutyl ether, 0.3 parts by weight of Surfynol 104 (manufactured by Air Products Japan, Inc.) and 48.2 parts by weight of ion-exchanged water were mixed together, to give a water-based ink.

Comparative Example 1

Five parts by weight of a polymer A obtained by drying the polymer solution A obtained in Preparation Example 1 under reduced pressure was dissolved in 5 parts by weight of methyl ethyl ketone. Sixty-seven parts by weight of ion-exchanged water and 0.47 parts by weight of a 48% aqueous sodium hydroxide were added to the resulting solution. The mixture was blended with a disper type impeller for 30 minutes. Further, 20 parts by weight of a quinacridone pigment [C.I. Pigment Red 122, manufactured by DAINIPPON INK & CHEMICALS, INC. under the trade name of Fastogen Super Magenta RG] was added thereto, thereafter the mixture was blended with a disper type impeller at 20° C. for 2 hours. The solid content of the mixture was 26% by weight.

The resulting mixture was passed through a Microfluidizer [trade name, manufactured by Microfluidics Corp.] 5 times as a dispersing operation under pressure of 180 MPa. The resulting dispersion was treated in the same manner as in Example 1, to give a water-based ink.

Comparative Example 2

Five parts by weight of a polymer A obtained by drying the polymer solution A obtained in Preparation Example 1 under reduced pressure was dissolved in 4 parts by weight of methyl ethyl ketone. One part by weight of ion-exchanged water and 0.47 parts by weight of a 48% aqueous sodium hydroxide were added to the resulting solution. The mixture was blended with a disper type impeller for 30 minutes, and thereafter the mixture was supplied to a kneader. Further, 20 parts by weight of a quinacridone pigment [C.I. Pigment Red 122, manufactured by DAINIPPON INK & CHEMICALS, INC. under the trade name of Fastogen Super Magenta RG] was added thereto. The solid content of the mixture was 83% by weight. Next, the mixture was kneaded at 60° C. for 30 minutes. However, the kneaded mixture was aggregated in the kneader, so that the mixture did not have a suitable kneaded state.

Average particle diameter, filterability and gloss were evaluated for the resulting water-based ink in accordance with the following methods. The results are shown in Table 1.

(1) Average Particle Diameter

Average particle diameter was determined (at 20° C.) with a laser particle analyzer system manufactured by Otsuka Denshi K.K. under the trade name of ELS-8000.

(2) Filterability

The water-based ink was filtered with a 25-mL needle-less syringe [manufactured by TERUMO CORPORATION] equipped with a filter having a pore diameter of 0.8 μm [acetyl cellulose membrane, outer diameter: 2.5 cm, manufactured by Fuji Photo Film Co., Ltd.]. The amount of filtered liquid was determined until the filter was clogged. The filterability was evaluated on the basis of the following evaluation criteria.

[Evaluation Criteria]

○: The amount of filtered liquid being at least 100 mL

Δ: The amount of filtered liquid being at least 20 mL and less than 100 mL

X: The amount of filtered liquid being less than 20 mL (3) Gloss

Solid image printing was carried out on commercially available MC Gloss Paper using an inkjet printer manufactured by SEIKO EPSON CORPORATION, (Model Number: EM900C), and the printed image was allowed to stand at 25° C. for 1 hour. Thereafter, its gloss was determined with a glossmeter [manufactured by Nippon Denshoku Kogyo K.K., the trade name: HANDY GLOSSMETER, the product number: PG-1], and evaluated on the basis of the following evaluation criteria.

[Evaluation Criteria]

○: Being at least 35

Δ: Being at least 30 and less than 35

X: Being less than 30

Preparation Example 2

A reaction vessel was charged with 3.4 parts by weight of styrene monomer, 3 parts by weight of styrenic macromer [manufactured by TOAGOSEI CO., LTD., the trade name: AN-6], 1.18 parts by weight of n-butyl methacrylate [manufactured by Mitsubishi Gas Chemical Company, Inc., the trade name: GE-310], 2.5 parts by weight of octylpolyethylene glycol polypropylene glycol methacrylate [manufactured by NOF Corporation, the trade name: Blemmer 50POEP-800B] and 0.018 parts by weight of a polymerization chain transfer agent (2-mercaptoethanol), and the mixture was blended. Nitrogen gas replacement was sufficiently carried out, to give a mixed solution.

On the other hand, a dropping funnel 1 was charged with 27.2 parts by weight of styrene monomer, 27 parts by weight of styrenic macromer [manufactured by TOAGOSEI CO., LTD., the trade name: AN-6], 7.84 parts by weight of n-butyl methacrylate [manufactured by Mitsubishi Gas Chemical Company, Inc., the trade name: GE-310], 20 parts by weight of octylpolyethylene glycol polypropylene glycol methacrylate [manufactured by NOF Corporation, the trade name: Blemmer 50POEP-800B], 12.8 parts by weight of methacrylic acid, 0.126 parts by weight of a polymerization chain transfer agent (2-mercaptoethanol), 14 parts by weight of methyl ethyl ketone and 0.4 parts by weight of 2,2'-azobis (2,4-dimethylvaleronitrile), and the mixture was blended. Nitrogen gas replacement was sufficiently carried out, to give a mixed solution.

Also, a dropping funnel 2 was charged with 3.4 parts by weight of styrene monomer, 0.98 parts by weight of n-butyl methacrylate [manufactured by Mitsubishi Gas Chemical Company, Inc., the trade name: GE-310], 2.5 parts by weight of octylpolyethylene glycol polypropylene glycol methacrylate [manufactured by NOF Corporation, the trade name: Blemmer 50POEP-800B], 3.2 parts by weight of methacrylic acid, 0.036 parts by weight of a polymerization chain transfer agent (2-mercaptoethanol), 12.3 parts by weight of methyl ethyl ketone and 0.1 parts by weight of 2,2'-azobis (2,4-dimethylvaleronitrile), and the mixture was blended. Nitrogen gas replacement was sufficiently carried out, to give a mixed solution.

The temperature of the mixed solution in the reaction vessel was raised to 65° C. under nitrogen atmosphere while stirring the mixed solution. The mixed solution in the dropping funnel 1 was gradually added dropwise thereto over a period of 3 hours. Next, the mixed solution in the dropping funnel 2 was gradually added dropwise thereto over a period of 2 hours. After 30 minutes passed from the termination of the dropwise addition at 75° C., a solution prepared by dissolving 0.9 parts by weight of 2,2-azobis(2, 4-dimethylvaleronitrile) in 40.5 parts by weight of methyl ethyl ketone was added dropwise thereto, and the resulting mixture was aged at 80° C. for 1 hour, to give a polymer solution B.

A part of the resulting polymer solution B was dried at 105° C. under reduced pressure for 2 hours, and isolated by removing the solvent. The weight-average molecular weight was determined by gel permeation chromatography using polystyrene as a standard substance, and chloroform containing 1 mmol/L dodecyldimethylamine as a solvent. As a result, the weight-average molecular weight was 120000.

Example 2

A kneaded mixture was obtained by kneading at 20° C. for 3 hours in the same manner as in Example 1, except that the polymer solution B obtained in Preparation Example 2 was used.

The resulting kneaded mixture was kneaded with a triple-roll mill while adding 10 parts by weight of ion-exchanged water thereto. Thereafter, 50 parts by weight of ion-exchanged water was added thereto to dilute the kneaded mixture. The resulting solution was subjected to passed through a with Microfluidizer [trade name, manufactured by Microfluidics Corp.] 10 times as a dispersing operation under pressure of 200 MPa.

Thirty parts by weight of ion-exchanged water was added to the resulting dispersion while stirring, and thereafter the organic solvent and a part of water were removed under reduced pressure at 60° C., to give an aqueous dispersion of polymer particles containing a pigment, the solid content of which was 20% by weight.

Example 3

A dispersion-treated mixture and an aqueous dispersion of polymer particles containing a pigment were obtained in the same manner as in Example 2, except that the mixture was kneaded at a kneading temperature of 30° C. for 5 hours.

Example 4

A dispersion-treated mixture and an aqueous dispersion of polymer particles containing a pigment were obtained in the same manner as in Example 2, except that the mixture was kneaded at a kneading temperature of 40° C. for 5 hours.

An average particle diameter of the dispersion obtained in Example 2 to 4 and an average particle diameter of an aqueous dispersion of polymer particles containing a pigment after being centrifuged under the conditions of 22000 G and 20 minutes to remove coarse grains were determined with above-mentioned measurement device. Rate of change of particle diameter was determined in accordance with the equation:

[Rate of change of particle diameter (%)]=[(Average particle diameter of dispersion-treated mixture−Average particle diameter after centrifugation)÷(Average particle diameter of dispersion-treated mixture)]×100.

The rate of change of particle diameter was evaluated on the basis of the following evaluation criteria. The results are shown in Table 2.

[Evaluation Criteria]

○: Rate of change of particle diameter being less than 5%

Δ: Rate of change of particle diameter being at least 5% and less than 10%

X: Rate of change of particle diameter being at least 10%

TABLE 1

| | Physical Properties of Water-Based Ink | | |
|---|---|---|---|
| Ex. No. and Comp. Ex. No. | Average Particle Diameter (nm) | Filterability (Amount of Filtered Liquid) | Gloss |
| Ex. 1 | 152 | ○ (185 mL) | ○ |
| Comp. Ex. 1 | 185 | Δ (50 mL) | X |
| Comp. Ex. 2 | Could not be kneaded with kneader | | |

TABLE 2

| Ex. No. | Average Particle Diameter of Dispersion-Treated Mixture (nm) | Average Particle Diameter after Centrifugation (nm) | Rate of Change of Particle Diameter (%) |
|---|---|---|---|
| Ex. 2 | 153 | 152 | ○ (0.7) |
| Ex. 3 | 156 | 153 | ○ (1.9) |
| Ex. 4 | 162 | 152 | Δ (6.2) |

It can be seen from the results shown in Table 1 that according to Example 1, the aqueous dispersion of a pigment having a smaller average particle diameter of dispersion particles, and the water-based ink having excellent filterability and gloss, containing the aqueous dispersion can be obtained as compared to Comparative Example 1 which is a conventional art.

Also, when the kneading temperature is low, it can be seen from the results shown in Table 2 that the rate of change of the average particle diameter of the resulting dispersion and the average particle diameter after centrifugation is small, and that the polymer particles containing a pigment are more homogenized while kneading. Since more homogenized polymer particles containing a pigment can be obtained as the dispersion-treated mixture, the loss of coarse grains during centrifugation can be reduced and the time for the centrifugation step can be shortened.

As explained above, according to the process of the present invention, an aqueous dispersion of a pigment, containing dispersed particles having a smaller average particle diameter than those obtained in the conventional processes. Further, a more homogeneous pigment aqueous dispersion can be prepared by adjusting the temperature during kneading low. Also, if the resulting aqueous dispersion of a pigment is used, a water-based ink which is excellent in filterability and gloss can be obtained.

EQUIVALENT

The present invention may be embodied in other various forms without departing from the spirit or essential characteristics thereof. The above embodiments are therefore to be construed in all respects as illustrative and not restrictive. The scope of the present invention being indicated by the appended claims rather than by the foregoing description and all changes which come within the meaning and range equivalent to the claims are therefore intended to be embraced therein.

What is claimed is:

1. A process for preparing an aqueous dispersion of a pigment, comprising:
   (A) kneading a mixture containing a pigment, a polymer having a salt-forming group, a neutralizing agent for neutralizing the polymer having a salt-forming group, an organic solvent and water, wherein the concentration of solid matter is 50 to 80% by weight;
   (B) adding only water to the resulting kneaded mixture to dilute the mixture; and
   (C) dispersing the solid matter in the resulting diluted mixture,
   wherein the resulting kneaded mixture is subjected to the step (B) after the mixture is kneaded with a kneader and further kneaded with a roll-mill in the step (A).

2. The process for preparing an aqueous dispersion of a pigment according to claim 1, wherein the solid matter in the diluted mixture is dispersed with a high-pressure homogenizer in the step (C).

3. A water-based ink comprising the aqueous dispersion of a pigment, obtained by the process of claim 1.

4. The process as claimed in claim 1, wherein the pigment is at least one organic pigment selected from the group consisting of an azo pigment, a diazo pigment, a phthalocyanine pigment, a quinacridone pigment, an isoindolinone pigment, a dioxazine pigment, a perylene pigment, a perinone pigment, a thioindigo pigment, an anthraquinone pigment, and a quinophthalone pigment.

5. The process according to claim 1, wherein the pigment is at least one inorganic pigment selected from the group consisting of carbon black, a metal oxide, a metal sulfide, and a metal chloride.

6. The process according to claim 1, wherein the pigment is carbon black.

7. The process according to claim 1, wherein the polymer is at least one selected from the group consisting of a vinyl polymer, a polyester polymer, and polyurethane polymer.

8. The process according to claim 1, wherein the polymer is a vinyl polymer including polymerized units of styrene, (meth)acrylic acid and (meth)acrylic acid ester.

9. The process according to claim 1, wherein the roll-mill is a double roll-mill or a triple roll-mill.

10. The process according to claim 1, further comprising supplying the pigment, the polymer, the neutralizing agent, the organic solvent and the water to the kneader before the kneading, separately.

11. A process for preparing an aqueous dispersion of a pigment, comprising:
   (A) kneading a mixture containing a pigment, a polymer having a salt-forming group, a neutralizing agent for neutralizing the polymer having a salt-forming group, an organic solvent and water, wherein the concentration of solid matter is 50 to 80% by weight;
   (B) adding water and/or an organic solvent to the resulting kneaded mixture to dilute the mixture; and
   (C) dispersing the solid matter in the resulting diluted mixture,
   wherein the resulting kneaded mixture is subjected to the step (B) after the mixture is kneaded with a kneader and further kneaded with a roll-mill in the step (A),
   wherein the temperature during kneading is at most 50° C. in the step (A).

12. A process for preparing an aqueous dispersion of a pigment, comprising:
   (A) kneading a mixture containing a pigment, a polymer having a salt-forming group, a neutralizing agent for neutralizing the polymer having a salt-forming group, an organic solvent and water, wherein the concentration of solid matter is 50 to 80% by weight;
   (B) adding water and/or an organic solvent to the resulting kneaded mixture to dilute the mixture; and
   (C) dispersing the solid matter in the resulting diluted mixture,
   wherein the resulting kneaded mixture is subjected to the step (B) after the mixture is kneaded with a kneader and further kneaded with a roll-mill in the step (A),
   wherein the polymer has a weight average molecular weight of from 52,000 to 300,000.

13. The process according to claim 12, wherein both water and an organic solvent are added to the resulting kneaded mixture in step (B).

14. A process for preparing an aqueous dispersion of a pigment, comprising:
   (A) kneading a mixture containing a pigment, a polymer having a salt-forming group, a neutralizing agent for neutralizing the polymer having a salt-forming group, an organic solvent and water, wherein the concentration of solid matter is 50 to 80% by weight;
   (B) adding water and/or an organic solvent to the resulting kneaded mixture to dilute the mixture; and
   (C) dispersing the solid matter in the resulting diluted mixture,
   wherein before the kneading, mixing the polymer, the organic solvent, water and the neutralizing agent in a separate container to form a pre-mixture, and
   supplying the pre-mixture to the kneader, and
   supplying the pigment to the kneader, and
   wherein the resulting kneaded mixture is subjected to the step (B) after the mixture is kneaded with a kneader, and further kneaded with a roll-mill in the step (A).

15. A process for preparing an aqueous dispersion of a pigment, comprising:
   (A) kneading a mixture containing a pigment, a polymer having a salt-forming group, a neutralizing agent for neutralizing the polymer having a salt-forming group, an organic solvent and water, wherein the concentration of solid matter is 50 to 80% by weight;
   (B) adding only an organic solvent to the resulting kneaded mixture to dilute the mixture; and
   (C) dispersing the solid matter in the resulting diluted mixture,
   wherein the resulting kneaded mixture is subjected to the step (B) after the mixture is kneaded with a kneader and further kneaded with a roll-mill in the step (A).

16. A process for preparing an aqueous dispersion of a pigment, comprising:
   (A) kneading a mixture containing a pigment, a polymer having a salt-forming group, a neutralizing agent for neutralizing the polymer having a salt-forming group, an organic solvent and water, wherein the concentration of solid matter is 50 to 80% by weight;
   (B) adding water and/or an organic solvent to the resulting kneaded mixture to dilute the mixture; and
   (C) dispersing the solid matter in the resulting diluted mixture,
   wherein the resulting kneaded mixture is subjected to the step (B) after the mixture is kneaded with a kneader and further kneaded with a roll-mill in the step (A),
   wherein the roll-mill is used while adding water to a kneaded mixture.

* * * * *